Nov. 17, 1953 — R. C. FISCHER — 2,659,610
DRAWBAR ASSEMBLY
Filed Aug. 24, 1950 — 2 Sheets-Sheet 1

Inventor
Raymond C. Fischer
by Kenneth Tuckwell
Attorney

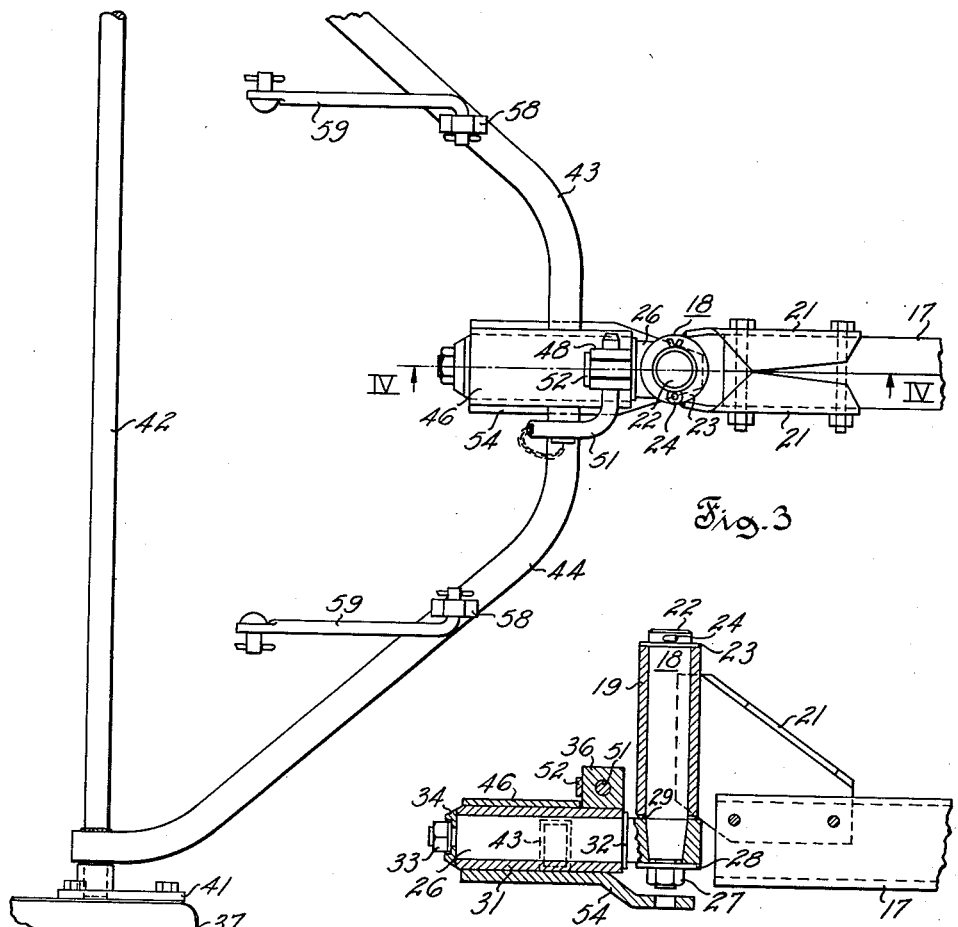

Patented Nov. 17, 1953

2,659,610

UNITED STATES PATENT OFFICE 2,659,610

DRAWBAR ASSEMBLY

Raymond C. Fischer, La Porte, Ind., assignor to Allis-Chalmers Manufacturing Company, Milwaukee, Wis.

Application August 24, 1950, Serial No. 181,123

2 Claims. (Cl. 280—33.44)

This invention relates in general to a hitch construction and more particularly to such a construction adapted for connecting a draft vehicle with a vehicle or implement adapted to be hitched to and drawn behind the draft vehicle.

In many instances draft vehicles, such as tractors and the like, are employed for drawing semitrailing vehicles or implements; that is, a vehicle or implement supported in part on the draft vehicle and in part by a ground engaging wheel or wheels (hereinafter called "semitrailer"), and for drawing trailing vehicles or implements which are supported entirely by ground engaging wheels and hereinafter called "trailers." And particularly in farm work, it is often necessary or desirable to frequently change from a trailer to a semitrailer in order to obtain efficient use of the draft vehicle. Consequently it is desirable that the trailer be provided with hitch means which permits such changes to be readily effected with a minimum of time and effort and which are suitable as to affording complete maneuverability without subjecting the hitch means to undue stresses and strains.

The present invention is directed toward and has as an object the provision of a hitch means incorporating features of improvement minimizing the time and effort necessary to connect a semitrailer to a draft vehicle and to disconnect the semitrailer from the draft vehicle and connect a trailer thereto in place of the semitrailer.

Another object of this invention is to provide a draft vehicle with a simplified hitch means selectively positionable for operatively coupling the draft vehicle with either a trailer or semitrailer.

Another object of this invention is to provide a draft vehicle with a simplified hitch means which is selectively positionable in either fixed or movable relation relative to the draft vehicle and which presents spaced coupling portions one of which detachably couples with a drawn vehicle connector complementary thereto in rigid load transmitting and supporting relation and the other of which detachably couples with a drawn vehicle connector complementary thereto in pivotal draft transmitting relation.

Still another object of this invention is to provide a draft vehicle and semitrailer with a quickly detachable draft transmitting coupling portion connectable in rigid load transmitting and supporting relation affording relative movement of the vehicles about horizontal and vertical axes lying in a common vertical plane extending in the general direction of the line of draft, and affording movement of the semitrailer and the coupling portions as a unit relative to the draft vehicle and about an axis transverse with respect to the line of draft.

The construction and operation of apparatus embodying the invention will become readily apparent as the disclosure progresses and particularly points out additional features and advantages considered of special importance. The invention may be considered as consisting of various details of construction, correlation of elements and arrangements of parts as is more fully set forth in the following description, reference being had to the accompanying drawings, in which:

Fig. 3 is a plan view of the draft hitch assembly shown in Fig. 1 with the far-side tractor and hitch part omitted in the interest of conserving space;

Fig. 4 is a sectional view on line IV—IV of Fig. 3;

Fig. 5 is an enlarged side elevation of the draft hitch assembly shown in Fig. 1 illustrating the tractor and vehicle portions of the hitch in proximate separated relation, a portion of the hitch being broken away for clarity of illustration;

Figure 1:
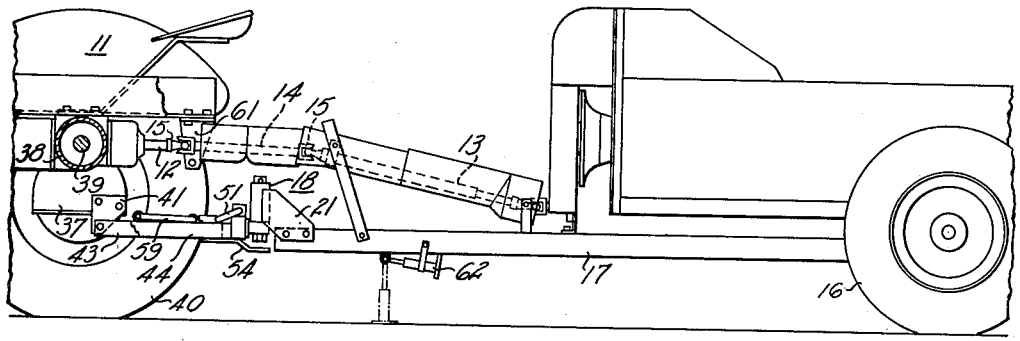
Fig. 1 is a side elevation of a tractor and trailing vehicle of a two wheeled type.

Referring to Fig. 1 of the drawings, it is seen that a tractor has been provided with a draft assembly for supporting the forward end of a two wheeled implement in draft relation thereto, such as the manure spreaders disclosed and claimed in the copending application of Charles J. Seranton filed March 3, 1950, Serial No. 147,391, for Manure Spreader. Tractor 11 is supplied with a conventional power take-off shaft 12 which is driven by the tractor engine (not shown) and which is drivingly connected to a telescoping shaft 13 by means of an intermediate section 14 and a pair of universal joints 15. As the operation of the manure spreader itself forms no part of this invention, the details of the spreader will not be further discussed except to mention that the spreader includes a two wheeled axle structure of which only the left wheel 16 is shown, and rigidly connected to this axle structure is a tongue element 17 which has attached at the forward end thereof a pivot assembly 18 including a hollow cylindrical vertically extending pivot or bearing member 19 joined to tongue 17 by means of a pair of brackets 21.

A pivot pin 22 is received within pivot member 19 for relative pivotal movement thereto about a vertical axis passing through the center of the pivot pin and such pivot pin is retained against vertical downward movement by means of a washer 23 and a cotter pin 24 (Figs. 3 and 4). The lower end of pivot pin 22 is tapered and received within a cone-shaped opening in a swivel member 26. The lower end of the pivot pin is threaded to receive a nut 27 which with washer 28 retains the tapered portion of the pivot pin seated within swivel 26. Nut 27 being tightened up until swivel 26 is drawn up against washer 29 which separates pivot member 19 from swivel 26 at which time the conical portion of pivot pin 22 is well seated in swivel 26.

A swivel housing or bearing structure 31 encircles the swivel for relative movement thereto about a longitudinal horizontal axis passing through the center of the swivel. Swivel housing 31 is retained on the swivel by means of an enlarged circumferential portion 32 formed on one end of the swivel member and by a nut 33 and washer 34 which nut is threadedly engaged with the other end of the swivel. Swivel housing 31 has a vertically extending lug 36 on the upper portion thereof which lug has a transversely extending hole 35 therethrough.

Tractor 11 is of the drop axle type having side portions 37 depending from an axle housing 38 and enclosing gearing operatively connecting a drive shaft 39 with tractor wheels 40 by conventional means (not shown). Attached to each side portion 37 adjacent the axis of rotation of wheels 40 is a drawbar pivot hub 41 which receives for pivotal movement about a transverse horizontal axis, a drawbar tube 42 (see Fig. 3). Attached adjacent the ends of drawbar tube 42 and extending therefrom in rearwardly converging relation are drawbar elements 43 and 44 which are attached at their rearward ends to a hitch socket 46 having a longitudinally extending slot 47 (see Fig. 5) in an upper surface thereof adapted to receive lug 36 attached to the upper surface of swivel housing 31. Adjacent to and on either side of slot 47 in the hitch socket are attached hitch socket lugs 48 having transversely extending aligned holes 49 therein adapted to be transversely aligned with the hole 35 in lug 36. A hitch pin 51 passes through the aligned holes in lugs 36 and 48 and rigidly connects swivel housing 31 with hitch socket 46. The forward ends of hitch lugs 48 are joined by a transversely extending stop member 52. Hitch pin 51 is chain connected to a hitch clip 53 attached to drawbar element 44.

Hitch clip 53 also functions as a stop member aiding in retaining hitch pin 51 positioned in holes 49 of the hitch socket lugs. A hitch plate 54 is attached to the underside of drawbar elements 43 and 44 and of hitch socket 46 and forms the base of such hitch socket. Hitch plate 54 presents a vertically extending hole 56 adjacent the rear end adapted to receive a conventional hitch pin 57 (see Fig. 2).

Figure 2:
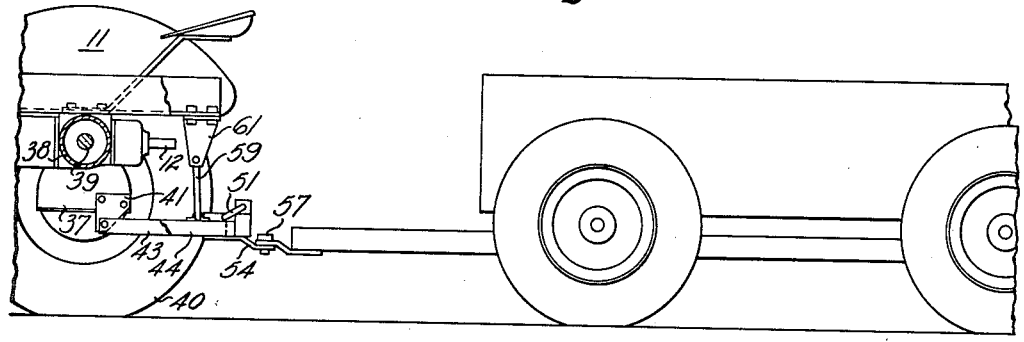
Fig. 2 is a side elevation of a tractor and trailing vehicle of a four wheeled type.
Figure 6:
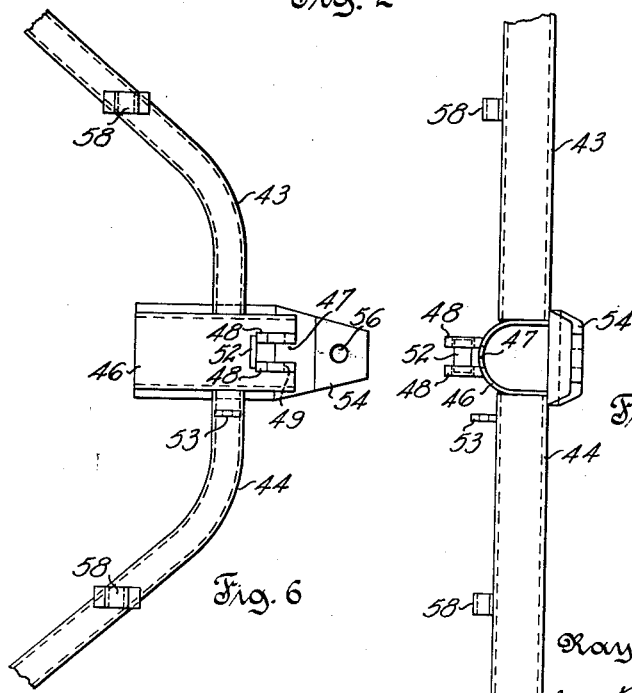
Fig. 6 is a plan view of the tractor portion of the draft hitch with some parts removed.
Figure 7:
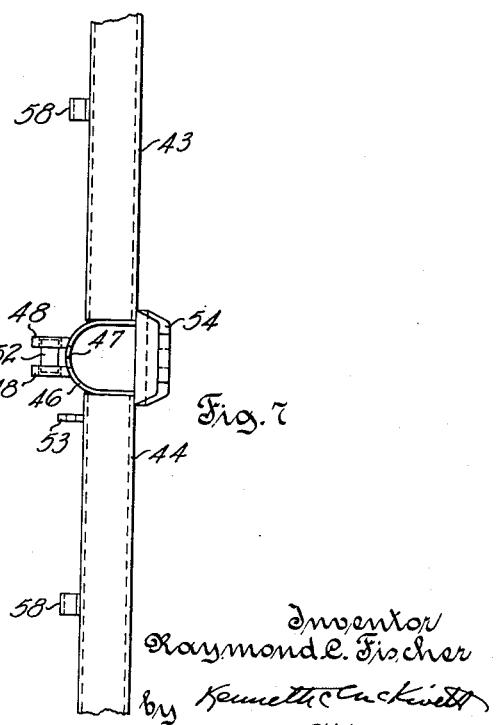
Fig. 7 is a rear view of the tractor portion of the draft hitch shown in Fig. 6 with some parts removed.

Drawbar elements 43 and 44 each have attached at a midportion thereof a strap element 58 which pivotally receives a drawbar brace 59 which braces are adapted to be attached at their other ends to depending brace brackets 61 carried by the frame of tractor 11 as is indicated in Fig. 2.

The operation of the draft assembly is as follows: Assume the manure spreader and tractor are joined as shown in Fig. 1 and it is desired to separate the tractor from the spreader. All that will have to be done is to jack up tongue 17 of the spreader by means of jack 62 as indicated in broken lines in Fig. 1, disconnect the power take-off connection 14 to the tractor, slide pin 51 transversely out of the holes in lugs 36 and 48 and drive the tractor forwardly. Upon such forward movement of the tractor hitch socket 46 will slide from around the swivel housing 31 as is indicated in Fig. 5 until the tractor and spreader are completely separated. After separation the braces 59 can be attached to the brace brackets 61 on the tractor which braces will then act as a support for the drawbar elements 43 and 44 so that the tractor can be utilized to draw vehicles such as shown in Fig. 2. To recouple the tractor to a two wheeled semitrailer such as shown in Fig. 1, the reverse of the steps in the foregoing procedure are taken.

This combination hitch assembly affords material advantages over known prior constructions. As illustrated in Fig. 1, a sizable proportion of the weight of the trailing vehicle and its load is being carried by the hitch assembly which transmits such load to the drawbar pivot hubs 41 which are positioned adjacent and below the axis of the wheels on the tractor and therefore this load is carried by the tractor at a point where the load will increase the traction on the rear driving wheels of the tractor and without providing any substantial turning movement tending to tip the tractor over backwards. And as has been previously described, this same hitch assembly can be readily used in a conventional manner as shown in Fig. 2 and when thus used is perfectly satisfactory for trailing vehicles which do not exert an excessive downward thrust on a drawbar.

When the draft assembly is used as shown in Fig. 1, it is seen that the two wheeled vehicle is provided with a hitch having three axes of pivotal movement. The vehicle can pivot about the transverse horizontal axis through the drawbar tube 42; it can pivot about the vertical axis through the pivot pin 22; and it can pivot about the longitudinal horizontal axis through the swivel 26 thereby providing means for complete maneuverability for short turns and rough ground conditions without stressing the hitch connections. In addition, the load is transferred to the tractor at points such that the tractor is least likely to be upset thereby and such that the load aids the tractive effort of the rear wheels rather than detracts therefrom.

When the draft assembly is utilized as shown in Fig. 2, it affords a conventional type of drawbar such as is customarily found in tractors. The ease with which the draft assembly can be changed from the special type of hitch shown in Fig. 1 to the conventional drawbar shown in Fig. 2 is one of the outstanding features of this invention.

The draft assembly shown in Fig. 2 is particularly adapted for use with medium size tractors as it enables such tractors to safely transport semitrailer loads which could not be thus transported with a standard hitch.

It should be understood that it is not intended to limit the invention to the exact details of construction, combinations of elements as herein shown and described for purposes of illustration as various modifications within the scope of the appended claims may occur to persons skilled in the art.

It is claimed and desired to secure by Letters Patent:

1. In combination in a wheeled draft vehicle and a semitrailer, a rearwardly extending drawbar member having forward portions thereof mounted for pivotal movement about an axis transverse to the line of draft on laterally spaced vehicle carried supports positioned adjacent the axis of rotation of the rear wheels of said vehicle, a receiving element attached to rear portions of said drawbar, a bearing structure received within said receiving element, means for detachably rigidly connecting said bearing structure and said receiving element to prevent relative movement thereof, a longitudinally extending pivot carried within said bearing structure for relative pivotal movement thereto about a longitudinal axis including the line of draft, a vertically extending pivot member attached to the rear end of said longitudinal pivot, and a vertically extending bearing member attached to the tongue structure of said semitrailer, said vertical bearing receiving said vertical pivot for pivotal movement relative thereto about a vertical axis through the line of draft.

2. In a hitch for connecting a semitrailer to a tractor comprising a rearwardly extending member having forward portions thereof pivotally mounted on laterally spaced tractor carried supports for relative vertical movement about an axis transverse to the line of draft of said tractor, a coupling receiving element attached to rear portions of said member in the line of draft of said tractor, a coupling structure attached to the forward end of said semitrailer and including a vertically extending spindle member received within a bearing structure for relative pivotal movement thereto about a vertical axis through the line of draft of said semitrailer, said vertical spindle having a horizontally extending portion attached thereto extending forwardly in the line of draft of said semitrailer, a second bearing structure mounted about said horizontal portion for relative pivotal movement thereto about the line of draft of said semitrailer, said second bearing structure being detachably received within said coupling receiving element, and detachable means carried by said rearwardly extending member for preventing relative movement of said receiving element and said second bearing structure.

RAYMOND C. FISCHER.

References Cited in the file of this patent
UNITED STATES PATENTS

| Number | Name | Date |
| --- | --- | --- |
| 870,177 | Hurd | Nov. 5, 1907 |
| 1,590,582 | Johnson et al. | June 29, 1926 |
| 1,730,077 | Isachsen | Oct. 1, 1929 |
| 1,981,443 | Winsor | Nov. 20, 1934 |
| 2,457,885 | Gatch | Jan. 4, 1949 |
| 2,471,636 | Martin | May 31, 1949 |
| 2,513,003 | Christensen | June 27, 1950 |